(12) United States Patent
Inaba

(10) Patent No.: US 12,090,407 B2
(45) Date of Patent: Sep. 17, 2024

(54) GAME DEVELOPMENT SYSTEM

(71) Applicant: NINTENDO CO., LTD., Kyoto (JP)

(72) Inventor: Sho Inaba, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 336 days.

(21) Appl. No.: 17/489,026

(22) Filed: Sep. 29, 2021

(65) Prior Publication Data

US 2022/0161139 A1    May 26, 2022

(30) Foreign Application Priority Data

Nov. 26, 2020 (JP) ................................ 2020-196144

(51) Int. Cl.
| | | |
|---|---|---|
| A63F 13/60 | (2014.01) | |
| A63F 13/211 | (2014.01) | |
| A63F 13/40 | (2014.01) | |
| A63F 13/70 | (2014.01) | |

(52) U.S. Cl.
CPC ............ *A63F 13/60* (2014.09); *A63F 13/211* (2014.09); *A63F 13/40* (2014.09); *A63F 13/70* (2014.09); *A63F 2300/6009* (2013.01)

(58) Field of Classification Search
CPC ...... A63F 13/211; A63F 13/40; A63F 13/428; A63F 13/49; A63F 13/60; A63F 13/70; A63F 2300/6009
See application file for complete search history.

(56) References Cited

U.S. PATENT DOCUMENTS

| | | | | |
|---|---|---|---|---|
| 8,771,062 B2 * | 7/2014 | Ocko | ................ | G06Q 20/4015 |
| | | | | 463/29 |
| 8,898,325 B2 * | 11/2014 | Lee | ........................ | G06N 3/004 |
| | | | | 709/230 |
| 9,005,027 B2 * | 4/2015 | Lee | ........................ | A63F 13/60 |
| | | | | 463/40 |
| 9,104,962 B2 * | 8/2015 | Lee | ........................ | A63F 13/12 |
| (Continued) | | | | |

FOREIGN PATENT DOCUMENTS

| | | |
|---|---|---|
| JP | 2003058395 A | 2/2003 |
| JP | 2009501386 A | 1/2009 |
| JP | 2016114341 A | 6/2016 |

OTHER PUBLICATIONS

Gregory, J., "Game Engine Architecture", Second Edition, SB Creative Corp., Apr. 1, 2015, pp. 408-409, together with an English language translation.

(Continued)

*Primary Examiner* — William H McCulloch, Jr.
(74) *Attorney, Agent, or Firm* — Scully, Scott, Murphy & Presser, P.C.

(57) ABSTRACT

A game development system includes: a game apparatus for executing a game program being developed; and an information processing apparatus that is communicably connected to the game apparatus. Processing that the game program being developed causes the computer of the game apparatus to execute includes generating a log relating to the data to be used in the game processing during execution of the game processing, which is processing for generating, in a binary format, a log in which a character string indicating a place holder and a character string that is not a place holder are included in a designated alignment, and the data to be substituted into the place holder is included.

28 Claims, 15 Drawing Sheets

(56) References Cited

U.S. PATENT DOCUMENTS

| | | | |
|---|---|---|---|
| 9,122,984 B2* | 9/2015 | Lee | A63F 13/352 |
| 9,370,722 B2* | 6/2016 | Ocko | A63F 13/12 |
| 9,384,442 B2* | 7/2016 | Lee | A63F 13/60 |
| 2002/0184366 A1 | 12/2002 | Kimoto et al. | |
| 2007/0016672 A1 | 1/2007 | Wilson et al. | |
| 2007/0185909 A1* | 8/2007 | Klein | G06F 8/20 |
| 2008/0220873 A1* | 9/2008 | Lee | A63F 13/352 |
| | | | 463/42 |
| 2009/0113445 A1* | 4/2009 | Sakashita | A63F 13/54 |
| | | | 717/126 |
| 2009/0265424 A1 | 10/2009 | Kimoto et al. | |
| 2010/0030785 A1 | 2/2010 | Wilson et al. | |
| 2013/0111016 A1 | 5/2013 | Wilson et al. | |
| 2013/0263090 A1* | 10/2013 | Polk | A63F 13/60 |
| | | | 717/124 |
| 2016/0001184 A1* | 1/2016 | Sepulveda | A63F 13/60 |
| | | | 463/31 |
| 2016/0001187 A1* | 1/2016 | Sepulveda | A63F 13/49 |
| | | | 463/31 |
| 2022/0161139 A1* | 5/2022 | Inaba | A63F 13/211 |

OTHER PUBLICATIONS

Decision to Grant a Patent dated Apr. 26, 2022 received in Japanese Patent Application No. JP 2020-196144 together with an English language translation.

* cited by examiner

```
LOG_INFO(
    "Battle.Player.HP",      //CATEGORY NAME
    "player.status",         //TABLE NAME
    "HP: {hp} / {hp_max}",   //LOG TEXT
    "hp", 12,                //Key-Value
    "hp_max", 30);
```

| PRESS-IN AMOUNT | PRESS-IN INSTANCE COUNT |
|---|---|
| 100% | 5 |
| 90% | 4 |
| 80% | 4 |
| 70% | 43 |
| 60% | 42 |
| 50% | 3 |
| 40% | 0 |
| 30% | 0 |
| 20% | 0 |
| 10% | 0 |

Fig. 17

GAME DEVELOPMENT SYSTEM

This application claims priority to Japanese Patent Application No. 2020-196144 filed on Nov. 26, 2020, the entire contents of which are incorporated herein by reference.

TECHNICAL FIELD

The present disclosure relates to a game development system and a game development method.

BACKGROUND ART

Conventionally, a process has been performed in which a log of a game being executed is output by including a function for outputting a character string such as printf during a program of a game being developed, and the output log is used for monitoring and analysis during execution of the game being developed.

SUMMARY

However, there has been concern that when an attempt is made to output a large number of logs for analysis, the resources of the game apparatus will be partially used for log output, which is not included in the product version, and thus the execution of game processing in the original performance will be hindered.

The present disclosure was made in order to solve this problem, and aims to provide a game development system and a game development method according to which it is possible to suppress the performance of a game apparatus from decreasing due to output of a log during execution of a game being developed.

A game development system according to a first viewpoint of the present disclosure includes: a game apparatus configured to execute a game program being developed; and an information processing apparatus that is communicably connected to the game apparatus, in which processing that the game program being developed causes a computer of the game apparatus to execute includes generating a log relating to data to be used in game processing during execution of the game processing, and for generating, in a binary format, a log in which a character string indicating a place holder and a character string that is not a place holder are included in a designated alignment and the data to be substituted into the place holder is further included, and the information processing apparatus is configured to receive, at any time, the log generated at any time accompanying execution of the game processing, and generating and outputting, at any time, a text-format log in which the character string in which the data has been substituted into the place holder and the character string that is not the place holder are written in the designated alignment, based on the received log in the binary format.

According to this configuration, when game processing is performed by executing a game program being developed in a game apparatus, processing for generating a character string by substituting the data to be used for game processing into a place holder is not performed by the game apparatus executing the game, but is performed by a connected information processing apparatus, and output is performed. For this reason, it is possible to suppress processing that is performed for log generation by the game apparatus. Since this kind of processing for log generation is not performed by the product version of the game program, it is possible to suppress the performance of the game apparatus from being partially used for this kind of processing. That is, while the game processing is being executed by the game apparatus, it is possible to suppress the performance of the game apparatus from decreasing in order to generate the character string of the log. For this reason, the game development system according to the present disclosure is suitable for outputting character strings for a large number of logs to perform analysis of game processing.

With a game development system according to a second viewpoint, in the game development apparatus according to the above-described first viewpoint, the data is a parameter in a game for which the game processing is being executed.

With a game development system according to a third viewpoint, in the game development apparatus according to the above-described second viewpoint, the game is a game in which a game controller including a sensor is to be used, and the parameter in the game includes a parameter obtained based on output from the sensor.

With a game using a sensor, there are many parameters to be monitored, and therefore a large number of parameters are generated as the character strings of the logs in some cases, but in such a case, the game development system of the present disclosure is favorable.

With a game development system according to a fourth viewpoint, in the game development apparatus according to any one of the above-described first to third viewpoints, the information processing apparatus is further configured to display, on a display apparatus, a log viewer for displaying a predetermined user interface and the text-format log.

According to this configuration, a log viewer can be generated without causing the game apparatus to perform additional processing. Accordingly, it is possible to suppress a decrease in the performance of the game apparatus performing game processing.

With a game development system according to a fifth viewpoint, in the game development apparatus according to the above-described second or third viewpoint, the information processing apparatus is further configured to display, on a display apparatus, a log viewer for displaying a predetermined user interface and the text-format log, and displaying, in a graph format, the parameter included in the log according to an instruction from an operator.

According to this configuration, a graph can be generated without causing the game apparatus to perform additional processing. Accordingly, it is possible to suppress a decrease in the performance of the game apparatus performing game processing.

With a game development system according to a sixth viewpoint, in the game development apparatus according to the above-described third viewpoint, the sensor is an inertia sensor, and the information processing apparatus is further configured to display a predetermined user interface and the text-format log, calculate an orientation of the game controller at any time using a parameter based on output from the inertia sensor included in the log according to an instruction from an operator, and display, on a display apparatus, a log viewer for displaying an object indicating the orientation of the game controller.

Conventionally, visualization of the orientation of a controller has been performed by incorporating a program for displaying on the game apparatus, but according to the present disclosure, visualization of the orientation of the controller can be performed by the information processing apparatus, and therefore it is possible to suppress a case of causing the game apparatus to perform extra processing.

With a game development system according to a seventh viewpoint, in the game development apparatus according to any one of the above-described first to third viewpoints, the data further includes image data, and the information processing apparatus is further configured to display, on a display apparatus, a log viewer for displaying a predetermined user interface and the text-format log and further displaying an image regarding the image data included in the log according to an instruction from an operator.

In this manner, since the data included in the log may not only be a character string but also an image, an image can also be received by the information processing apparatus in a binary format similarly to a character string, and processing such as display can be performed. Accordingly, processing of the image need not be performed by the game apparatus, and therefore it is possible to reduce the load on the game apparatus.

With a game development system according to an eighth viewpoint, in the game development apparatus according to any one of the above-described fourth to seventh viewpoints, the character string that is not the place holder includes a character string indicating a category of the data, and the log viewer displays the text-format log for each said category according to an instruction from an operator.

By doing so, it is possible to display a log for each category, and therefore analysis of the logs can be performed efficiently.

With a game development system according to a ninth viewpoint, in the game development apparatus according to the above-described eighth viewpoint, the character string indicating the category indicates a category hierarchically using a combination of a plurality of segmented character strings, and the log viewer displays the text-format log hierarchically according to an instruction from an operator.

Accordingly, since categories can be shown with a hierarchical structure, it is possible to display logs for each more specific category, and analysis of the logs can be performed more efficiently.

With a game development system according to a tenth viewpoint, in the game development apparatus according to any one of the above-described first to ninth viewpoints, based on the received log in the binary format, the information processing apparatus is further configured to create a database based on data of the game processing.

The data to be used in the game processing can be turned into a database by storing data such as the parameters included in the logs in the information processing apparatus. For this reason, analysis of parameters, such as the change over time in data such as parameters, or for example, monitoring of the load on the processor and the orientation of the controller, and the like can be simplified using this database.

With a game development system according to an eleventh viewpoint, in the game development apparatus according to the above-described tenth viewpoint, the game apparatus is configured to generate the binary-format log including the character string that is to be the place holder corresponding to the type of the data, and the information processing apparatus is configured to generate the database obtained by categorizing the data to be substituted into the place holder for each type of the character string that is to be the place holder.

By doing so, it is possible to categorize the logs in the database according to the types of the logs when constructing the database. Accordingly, analysis of the logs can be performed efficiently.

With a game development system according to a twelfth viewpoint, in the game development apparatus according to the above-described tenth or eleventh viewpoint, the data to be substituted into the place holder includes data indicating a memory occupancy degree or a load of processing during execution of the game processing by the game apparatus.

With a game development system according to a thirteenth viewpoint, in the game development apparatus according to the above-described tenth or eleventh viewpoint, the data to be substituted into the place holder includes data indicating at least one of a play time of a game being executed by the game apparatus, an item that can be acquired in a game, and a degree of completion of a game.

With a game development system according to a fourteenth viewpoint, in the game development apparatus according to the above-described tenth or eleventh viewpoint, the data to be substituted into the place holder includes data indicating operation content of a controller to be used for playing the game.

By doing so, it is possible to acquire a log of operations performed according to the structure of the controller, and therefore, for example, it is possible to perform evaluation of a new controller.

A game development method according to a fifteenth viewpoint includes generating in a game apparatus a log relating to data to be used in game processing during execution of the game processing using a game program being developed, and generating, in a binary format, a log in which a character string indicating a place holder and a character string that is not a place holder are included in a designated arrangement and the data to be substituted into the place holder is further included; and receiving in an information processing apparatus, at any time, the log generated at any time accompanying execution of the game processing, and, at any time, generating and outputting a text-format log in which a character string in which the data has been substituted into the place holder and the character string that is not the place holder are written in the designated alignment, based on the received log in a binary format.

A game development method according to a sixteenth viewpoint is the game development method according to the above-described fifteenth viewpoint, in which the data is a parameter in a game for which the game processing is being executed.

A game development method according to a seventeenth viewpoint is the game development method according to the above-described sixteenth viewpoint, in which the game is a game in which a game controller including a sensor is to be used, and the parameter in the game includes a parameter obtained based on output from the sensor.

A game development method according to an eighteenth viewpoint is the game development method according to any one of the above-described fifteenth to seventeenth viewpoints, further including, in the information processing apparatus, displaying, on a display apparatus, a log viewer for displaying a predetermined user interface and the text-format log.

A game development method according to a nineteenth viewpoint is the game development method according to the above-described sixteenth or seventeenth viewpoint, further including, in the information processing apparatus, displaying, on a display apparatus, a log viewer for displaying a predetermined user interface and the text-format log and displaying, in a graph format, the parameter included in the log according to an instruction from an operator.

A game development method according to a twentieth viewpoint is the game development method according to the above-described seventeenth viewpoint, in which the sensor is an inertia sensor, and the game development method further includes, in the information processing apparatus, displaying a predetermined user interface and the text-format log, calculating an orientation of the game controller at any time using a parameter based on output from the inertia sensor included in the log according to an instruction from an operator, and displaying, on a display apparatus, a log viewer for displaying an object indicating an orientation of the game controller.

A game development method according to a twenty-first viewpoint is the game development method according to any one of the above-described fifteenth to sixteenth viewpoints, in which the data further includes image data, and the game development method further includes, in the information processing apparatus, displaying, on a display apparatus, a log viewer for displaying a predetermined user interface and the text-format log and further displaying an image relating to image data included in the log according to an instruction from an operator.

A game development method according to a twenty-second viewpoint is the game development method according to any one of the above-described eighteenth to twenty-first viewpoints, in which the character string that is not the place holder includes a character string indicating a category of the data, and the log viewer displays the text-format log for each said category according to an instruction from an operator.

A game development method according to a twenty-third viewpoint is the game development method according to the above-described twenty-second viewpoint, in which the character string indicating the category indicates a category hierarchically using a combination of a plurality of segmented character strings, and the log viewer displays the text-format log hierarchically according to an instruction from an operator.

A game development method according to a twenty-fourth viewpoint is the game development method according to any one of the above-described fifteenth to twenty-third viewpoints, further including a step of the information processing apparatus further creating a database based on data of the game processing, based on the received log in the binary format.

A game development method according to a twenty-fifth viewpoint is the game development method according to the above-described twenty-fourth viewpoint, in which, the game apparatus is configured to generate the binary-format log including the character string that is to be the place holder corresponding to the type of the data, and the information processing apparatus is configured to generate the database obtained by categorizing data to be substituted into the place holder for each type of the character string that is to be the place holder.

A game development method according to a twenty-sixth viewpoint is the game development method according to the above-described twenty-fourth or twenty-fifth viewpoint, in which the data to be substituted into the place holder includes data indicating a memory occupancy degree or a load of processing during execution of the game processing by the game apparatus.

A game development method according to a twenty-seventh viewpoint is the game development method according to the above-described twenty-fourth viewpoint, in which the data to be substituted into the place holder includes data indicating at least one of a play time of a game being executed by the game apparatus, an item that can be acquired in a game, and a degree of completion of a game.

A game development method according to a twenty-eighth viewpoint is the game development method accord-ing to the above-described twenty-fourth or twenty-fifth viewpoint, in which the data to be substituted into the place holder includes data indicating operation content for a game controller to be used for playing the game.

According to the above-described game development system, it is possible to suppress the performance of the game apparatus from decreasing due to output of the log while a game being developed is executed.

BRIEF DESCRIPTION OF THE DRAWINGS

FIG. 17 is a diagram showing an example of an analysis tool for analyzing pressing-in of a ring-shaped controller.

EMBODIMENTS

Figure 1:
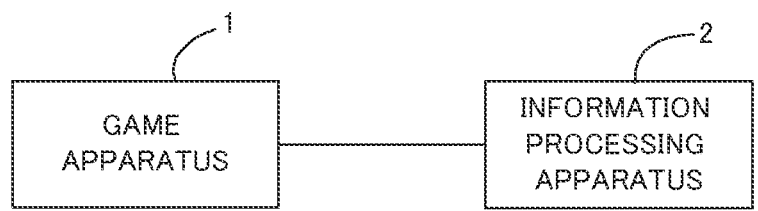
FIG. 1 is a schematic configurational view showing one embodiment of a game development system according to the present disclosure.

Hereinafter, an embodiment of a game development system according to the present disclosure will be described. FIG. 1 is a schematic configurational diagram of the game development system.

1. Overview of Game Development System

The game development system according to the present disclosure includes a game apparatus 1 and an information processing apparatus 200 that is communicably connected to the game apparatus 1. The game apparatus 1 and the information processing apparatus 200 can be connected with a wire or wirelessly. Alternatively, the game apparatus 1 and the information processing apparatus 200 can also be connected via a network such as an LAN or the Internet. As will be described later, the game apparatus 1 is an apparatus for performing game processing by executing a game program being developed. Also, the information processing apparatus 200 is configured to display various types of logs generated when the game processing being developed is performed in the game apparatus 1 and to generate a database of logs for use in analysis. Hereinafter, an example of the game apparatus 1 and the information processing apparatus 200 will be described in detail.

2. Game Apparatus 2-1. Hardware of Game Apparatus

An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 3). Hereinafter, first, the hardware configuration of the game system 1 according to the exemplary embodiment is described, and then, the control of the game system 1 according to the exemplary embodiment is described.

2-1-1. Main Body Apparatus

Figure 2:
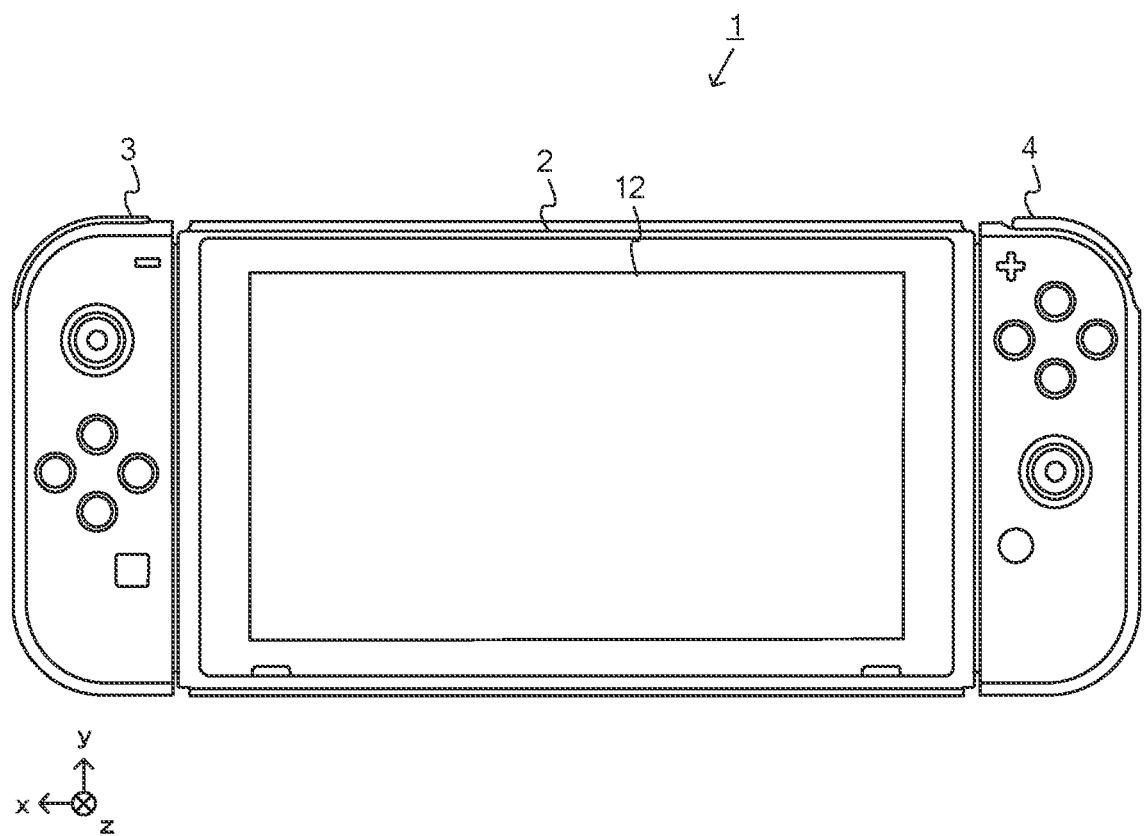
FIG. 2 is a diagram showing an example of a game system in a state in which a left controller and a right controller are attached to a main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
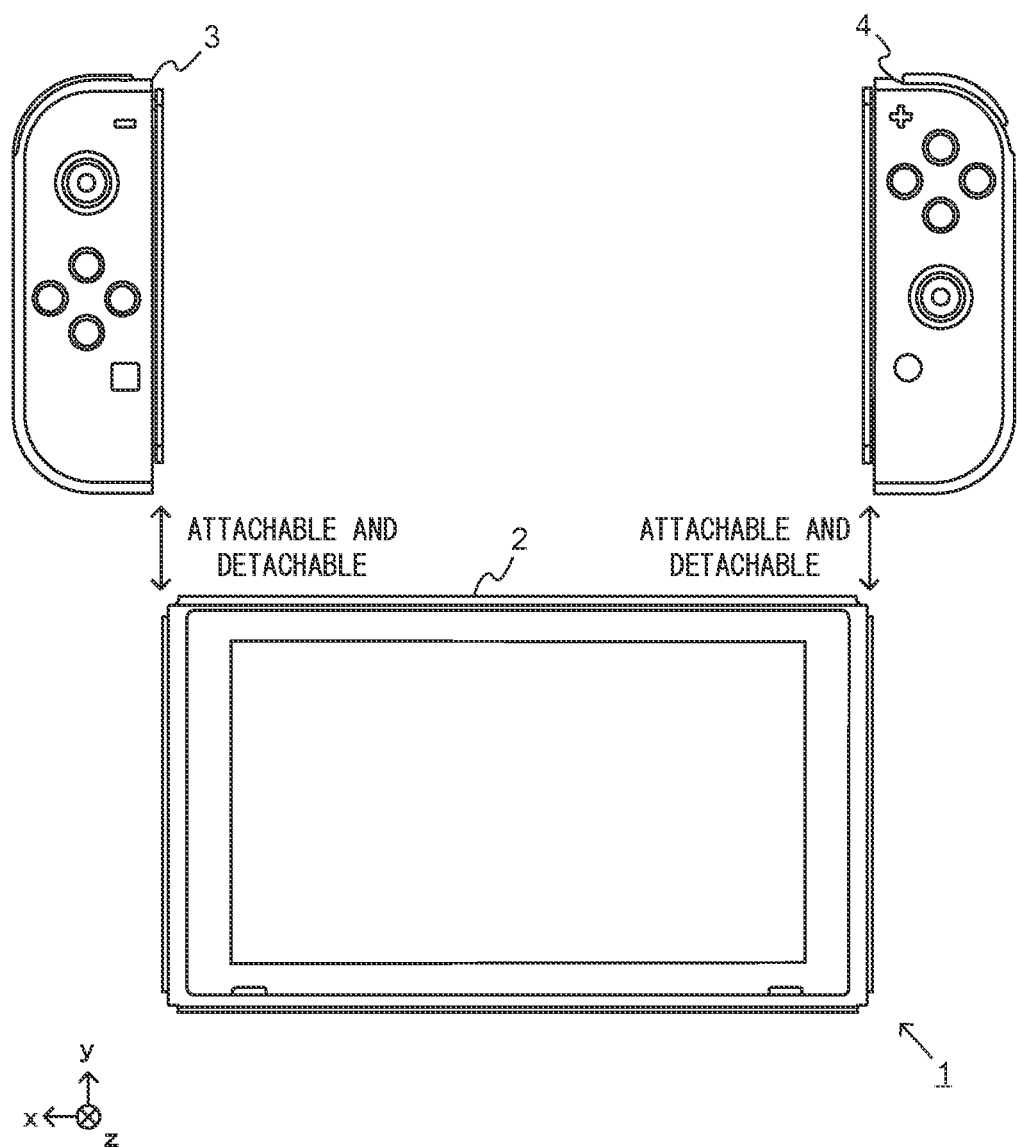
FIG. 3 is a diagram showing an example of a game system in a state in which the left controller and the right controller have been removed from the main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

2-1-2. Internal Configuration of Main Body Apparatus

Figure 4:
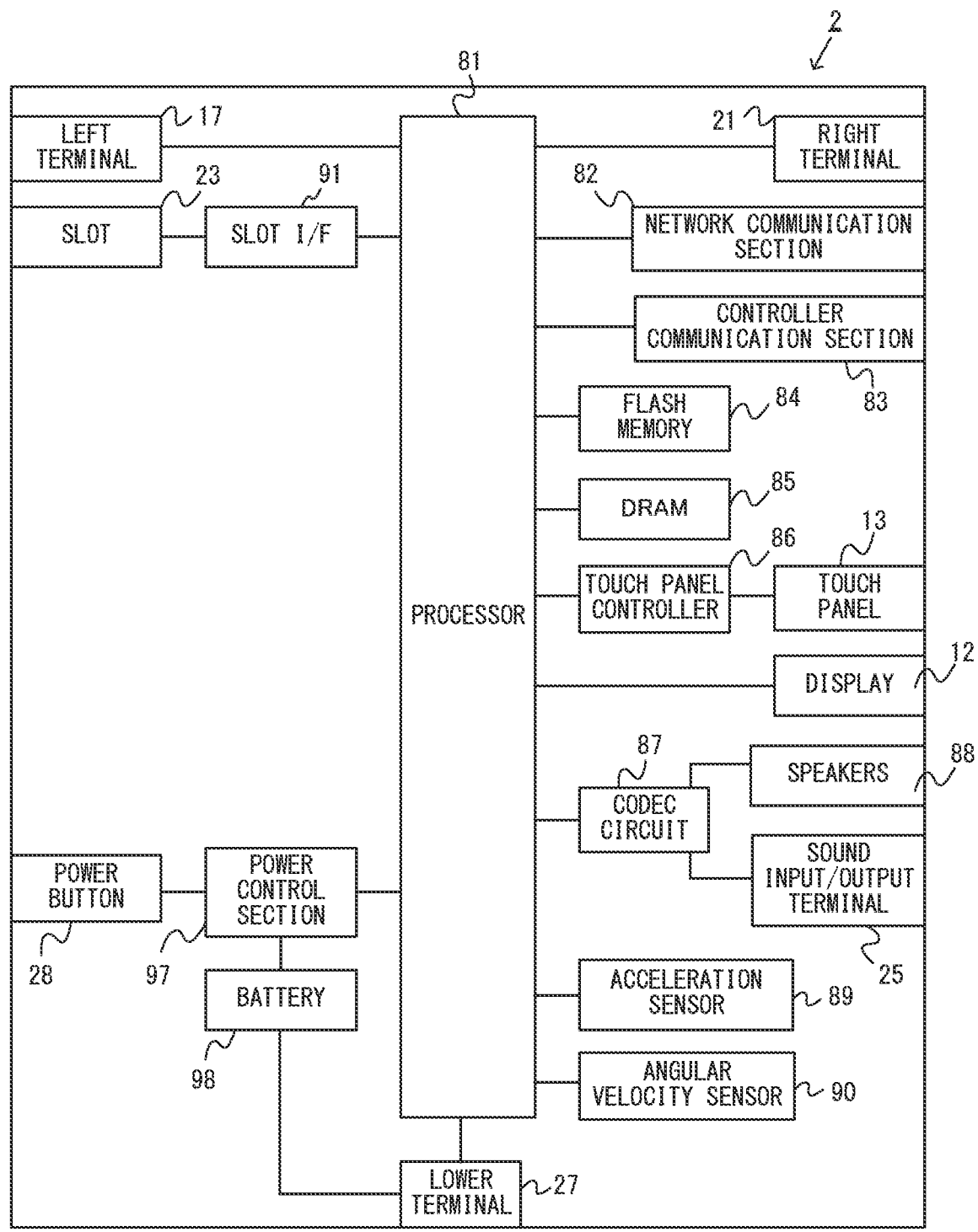
FIG. 4 is a block diagram showing an example of an internal configuration of the main body apparatus.

FIG. 4 is a block diagram showing an example of the internal configuration of the main body apparatus 2. The main body apparatus 2 includes components 12, 13, 17, 21, 25, 27, 28, 81 to 91, 97, and 98 shown in FIG. 4. Some of the components 12, 13, 17, 21, 25, 27, 28, 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 2) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 2). It should be noted that the angular velocity sensor 90 may detect an angular velocity about one axis or angular velocities about two axes.

The main body apparatus 2 includes a power button 28, a power control section 97 and a battery 98. The power control section 97 is connected to the battery 98 and the processor 81. Further, although not shown in FIG. 2, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

2-1-3. Internal Configuration of Controller

Figure 5:
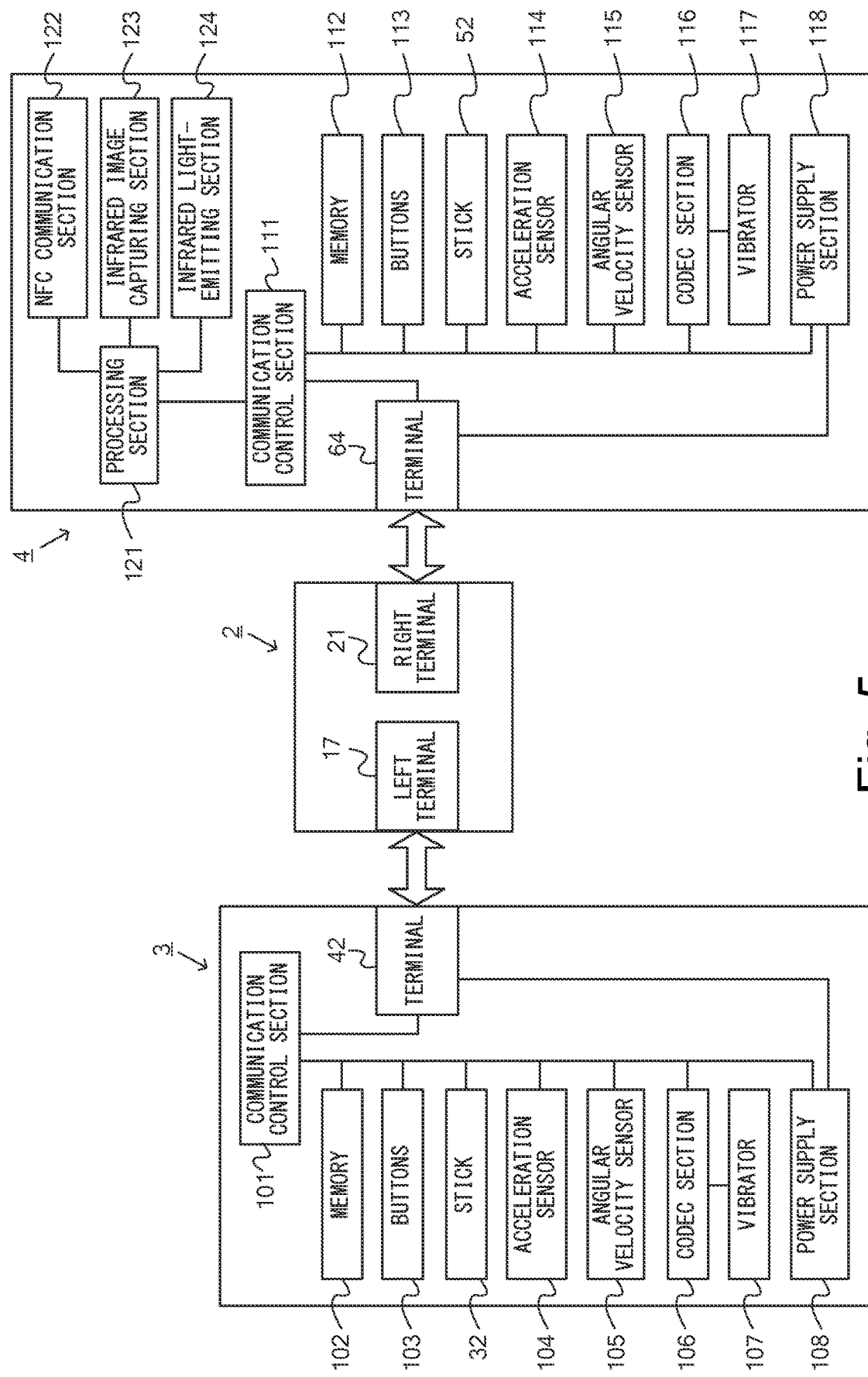
FIG. 5 is a block diagram showing an example of internal configurations of the main body apparatus, the left controller, and the right controller.

FIG. 5 is a block diagram showing examples of the internal configurations of the main body apparatus 2, the left controller 3, and the right controller 4. It should be noted that the details of the internal configuration of the main body apparatus 2 are shown in FIG. 4 and therefore are omitted in FIG. 4.

The left controller 3 includes a communication control section 101, which communicates with the main body apparatus 2. As shown in FIG. 5, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 5) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The left controller 3 includes a codec section 106 and a vibrator 107 for giving notification to the user by a vibration. In the exemplary embodiment, the codec section 106 and the vibrator 107 is controlled by a command from the main body apparatus 2.

The left controller 3 includes a power supply section 108. In the exemplary embodiment, the power supply section 108 includes a battery and a power control circuit. Although not shown in FIG. 5, the power control circuit is connected to the battery and also connected to components of the left controller 3 (specifically, components that receive power supplied from the battery).

As shown in FIG. 5, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2. Further, the right controller 4 includes a processing section 121 which is connected to the communication control section 111. The processing section 121 is connected to the NFC communication section 122, the infrared image capturing section 123, and the infrared light-emitting section 124.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

2-2. Functional Configuration of Game Apparatus

Figures 6, 7:
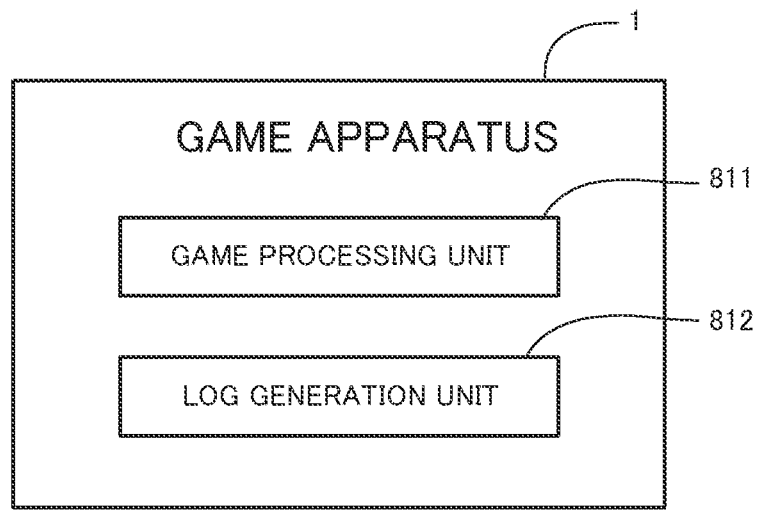
FIG. 6 is an example of a block diagram showing a functional configuration of a game apparatus.
FIG. 7 is a diagram showing an example of an output code.

Next, a functional configuration (software configuration) of the game apparatus configured as described above will be described. FIG. 6 is an example of a functional configuration of a game apparatus according to the present embodiment. The processor 81 of the game apparatus 1 expands a game program stored in the flash memory 84 or an external storage medium mounted in the slot 23 to the DRAM 85. Then, the processor interprets and executes the game program expanded to the DRAM 85 to control the functional constituent elements. Accordingly, the game apparatus 1 according to the present embodiment functions as a computer that includes a game processing unit 811 and a log generation unit 812.

The game processing unit 811 causes the game apparatus 1 to perform the game being developed. That is, the game processing unit 811 causes the game apparatus 1 to perform game processing. The log generation unit 812 generates a log relating to various types of parameters to be used in the game processing during execution of the game processing in a binary format. Various parameters to be used in the game, such as parameters indicating properties and abilities (e.g., HP (hit points), MP (magic points), etc.) of characters and objects that appear in the game, play time of the game being executed, items that can be acquired in the game, degree of completion of the game, parameters obtained based on output from various sensors provided in the above-described game apparatus 1, such as inertia sensors 89, 90, 104, 105, 114, 115, and the like, the processing load on the processor 81 executing the game processing, the memory occupancy degree, the levels of various players and characters in the game, and various items acquired by the player during game processing can be set as the various parameters.

Note that the log generation unit 812 is a functional configuration that is executed in the game processing being developed, and is not included in the product version of the game processing. Accordingly, in the game program, a program for causing the game apparatus 1 to function as the log generation unit 812 is deleted from the product version of the game program. That is, unless otherwise stated, the expression "game program" that is used in the present disclosure does not mean the product version of the game program, but the game program undergoing game development.

Next, the log generation unit 812 will be described. The log generation unit 812 generates a binary-format output code for generating a binary-format log. In view of this, first, the output code will be described. An output code for generating a text-format log for the above-described various parameters is generated at a given timing during the execution of the game processing.

FIG. 7 is an example of an output code. A category name, a table name, log text, and a given key value are included in the output code shown in FIG. 7. The category name is the category of the log, and in the example of FIG. 7, it is the HP of a fighting character. The table name is the table name in the database of the log constructed in the later-described information processing apparatus 200. That is, the data included in this log is stored in the table with the name "player_status" in the database. The log text includes a character string that is a place holder and a character string that is not a place holder, and this log text is displayed in the information processing apparatus 200 in a text format. Specifically, "HP:" and "/" are character strings that are not place holders, and these character strings are converted to text as-is. On the other hand, [hp] and [hp_max] are character strings that are place holders. The key value is a numeric value (argument) that is to be substituted into [hp] and [hp_max], which are place holders. That is, 12 is substituted into [hp] and 30 is substituted into [hp_max], and thereafter the log text is output in a text format. Accordingly, the text-format log that is output using this output code is "HP: 12/30", and this is displayed on the information processing apparatus 200. This kind of log is generated at a given timing during game processing.

Note that the table name is not necessarily needed, and the table name need not be included in the output code if the log is not to be stored in a later-described database.

However, the game apparatus 1 according to the present embodiment does not output a text-format log as described above, but as will be described later, a text-format log is output by the information processing apparatus 200. For this reason, the log generation unit 812 generates an output code such as that shown in FIG. 7 in a binary format during game processing, and transmits the generated output code to the information processing apparatus 200.

Figure 8:
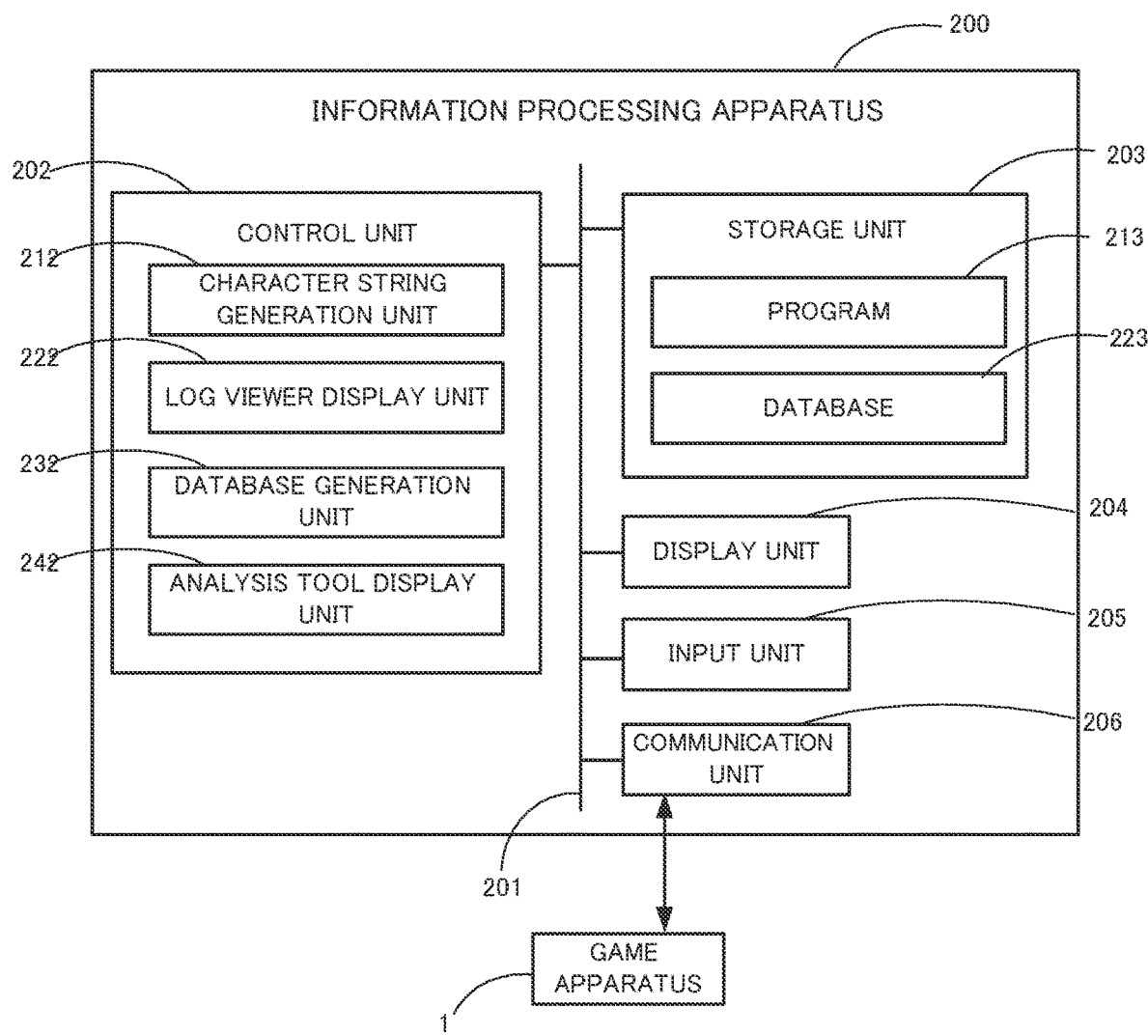
FIG. 8 is a block diagram showing a hardware configuration of an information processing apparatus.

3. Overview of Information Processing Apparatus 3-1. Hardware Configuration of Information Processing Apparatus Next, the information processing apparatus 200 will be described with reference to FIG. 8. FIG. 8 is a block diagram showing an example of a hardware configuration of the information processing apparatus 200 according to the present embodiment.

As shown in FIG. 8, this information processing apparatus can be constituted by, for example, a known personal computer, tablet PC, or the like, and includes a control unit 202, a storage unit 203, a display unit 204, an input unit 205, and a communication unit 206, which are mutually connected by a bus 201.

The control unit 202 is constituted mainly by a CPU, a RAM, a ROM, and the like. The storage unit 203 can be constituted by a known storage apparatus such as an HDD or an SSD, and stores various types of data to be used by the control unit 202 to perform generation of text-format logs. For example, various types of data, such as a program 213 for performing generation of a log and the like, and a database 223 for logs are stored.

Also, when the control unit 202 executes the program 213 stored in the storage unit 203, the information processing apparatus 200 according to the present embodiment functions as a computer that includes a character string generation unit 212, a log viewer display unit 222, a database generation unit 232, and an analysis tool display unit 242. These functional configurations will be described later.

The display unit 204 is constituted by a display apparatus such as an LCD, and displays an image in accordance with an instruction from the control unit 202. Note that, for example, if the information processing apparatus 200 is constituted by a personal computer, the display unit 204 is constituted by a separate member from the information processing apparatus 200 in some cases.

The input unit 205 need only be an input apparatus that can be operated by an operator of the game developer, and can be constituted by a keyboard, a mouse, a touch panel, or the like. In the present embodiment, it is assumed that if an operation of pressing a button or the like displayed on the display unit 204 is to be performed, in one example, the button or the like is pressed using the mouse.

The communication unit 206 is constituted by a predetermined communication module and performs transmission and reception of data with a game apparatus.

3-2. Functional Configuration of Information Processing Apparatus

Next, the above-described character string generation unit 212, log viewer display unit 222, database generation unit 232, and analysis tool display unit 242 will be described.

3-2-1. Character String Generation Unit

When the communication unit 206 receives the binary-format output code generated by the game apparatus 1 as described above, the character string generation unit 212 generates a text-format log based on the received output code. For example, if the output code shown in FIG. 7 is received in a binary format, the numeric value of the key value is substituted into the place holder, and a text-format log "HP: 12/30" is generated. This log is displayed on a later-described log viewer 300.

3-2-2. Log Viewer Display Unit

Figure 9:
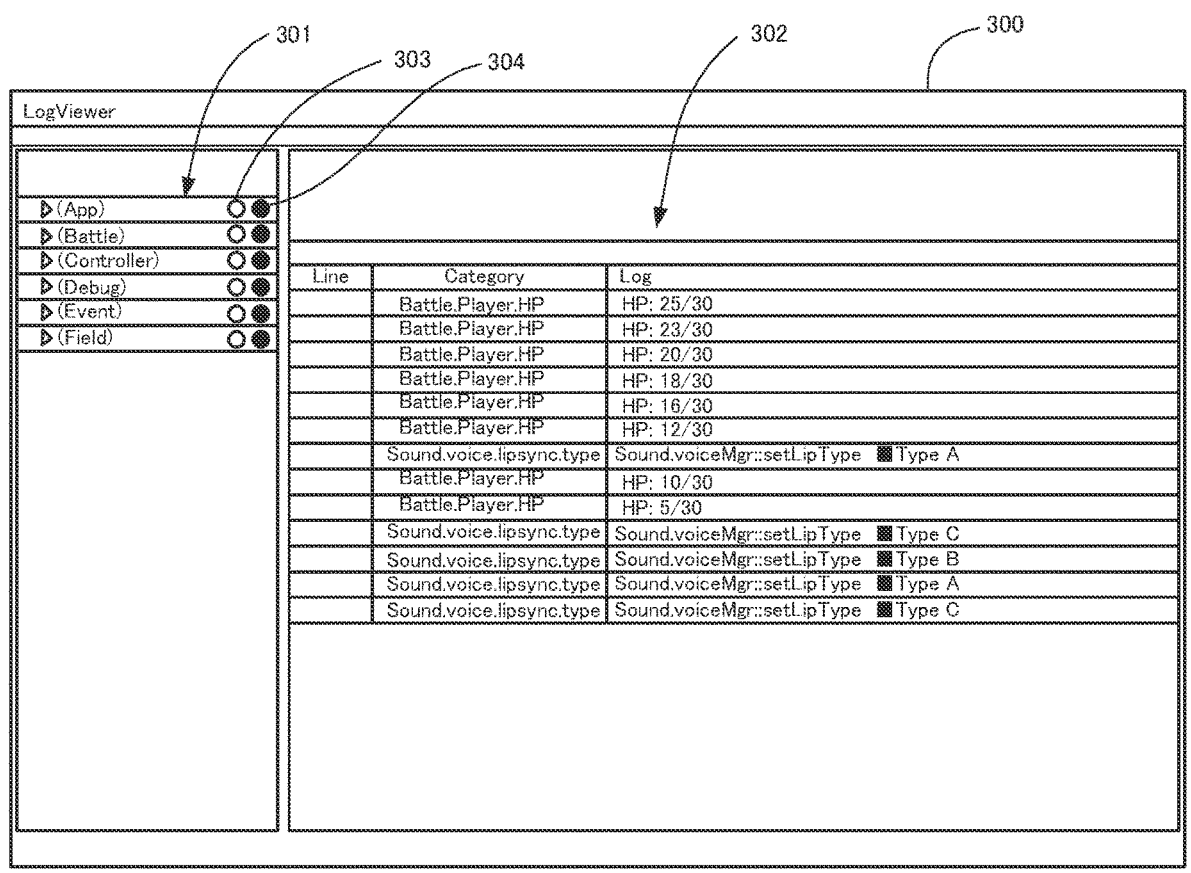
FIG. 9 is a diagram showing an example of a log viewer.

The log viewer display unit 222 displays a log viewer on the display unit 204. FIG. 9 is an example of a log viewer serving as a user interface for viewing a log. As shown in FIG. 9, this log viewer 300 includes a category display unit 301 and a log display unit 302. The categories of the logs are displayed as a list with a hierarchical structure on the category display unit 301. On the other hand, the text-format logs generated by the character string generation unit 212 are displayed chronologically on the log display unit 302. That is, the logs that were generated at any time by the game apparatus 1 and received at any time by the information processing apparatus 200 are displayed chronologically in a text format. In the example of FIG. 9, the log on the upper side is the oldest log.

To give a more detailed description, Line, Category, and Log are displayed for each log on the log display unit 302. Line is a line number, Category is a category to which the log belongs, and Log is the log converted to text by the character string generation unit 212.

The category of the highest tier is displayed on the category display unit 301 of FIG. 9, and when these upper categories are clicked on, low-tier categories (not shown) that belong to those categories are displayed. For example, although the log of the output code shown in FIG. 7 is the category Battle.Plyer.HP, this category is a category that belongs to the lower level of the category (Battle) of FIG. 9.

Also, an on button 303 and an off button 304 are displayed on the right side of each category displayed on the category display unit 301, and when the on button 303 is clicked on, the log belonging to that category is displayed on the log display unit 302. On the other hand, when the off button 304 is clicked on, the log belonging to that category is not displayed on the log display unit 302. Accordingly, by using the on buttons 303 and the off buttons 304, it is possible to display only logs relating to the categories to be browsed on the log display unit 302.

3-2-3. Database Generation Unit

Figure 10:
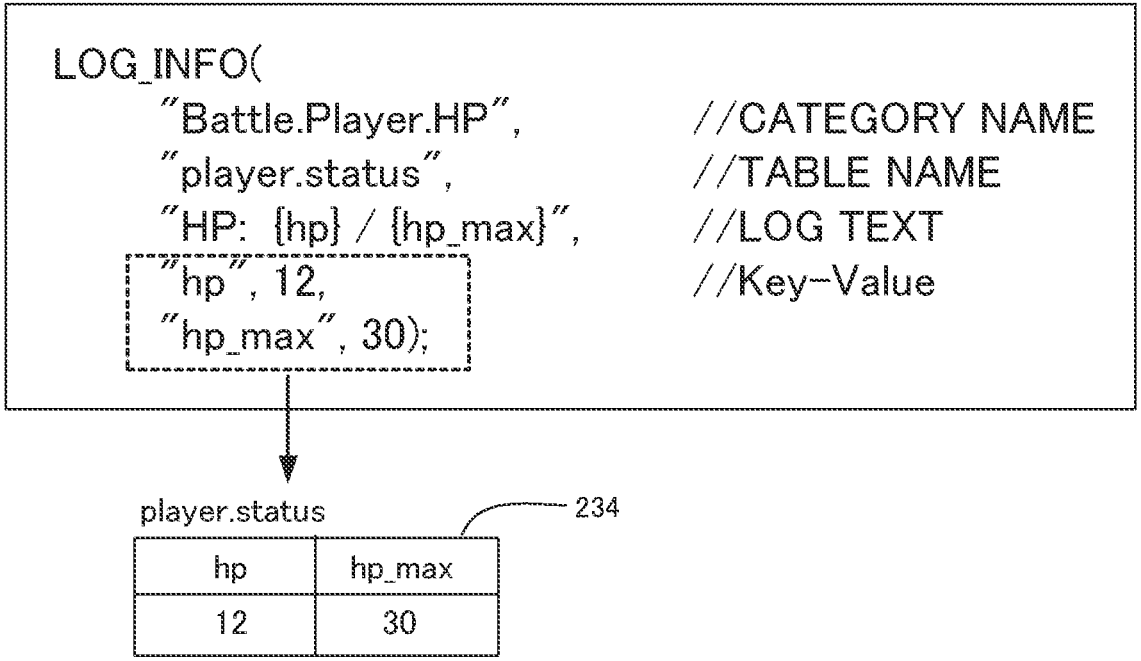
FIG. 10 is a diagram illustrating an example of constructing a database from an output code.

Next, the database generation unit 232 will be described. The database generation unit 232 reads out the table name and the key value from the binary-format output code received from the game apparatus 1 and stores the read-out table name and key value in the database. For example, if the output code of FIG. 7 is received, the key value is stored in the table 234 called player_status in the database. As shown in FIG. 10, the columns hp and hp_max for which the keys match are provided in the table 234 called player_status, and therefore the key value included in the received output code is chronologically written in the field of the corresponding key. In this manner, the key values included in the logs can be made into a database.

3-2-4. Analysis Tool Display Unit

Next, the analysis tool display unit 242 will be described. Hereinafter, three types of analysis tools will be described. The analysis tool display unit 242 displays a user interface for analyzing parameters for each type of game apparatus 1 based on the logs, that is, an analysis tool.

Figure 11:
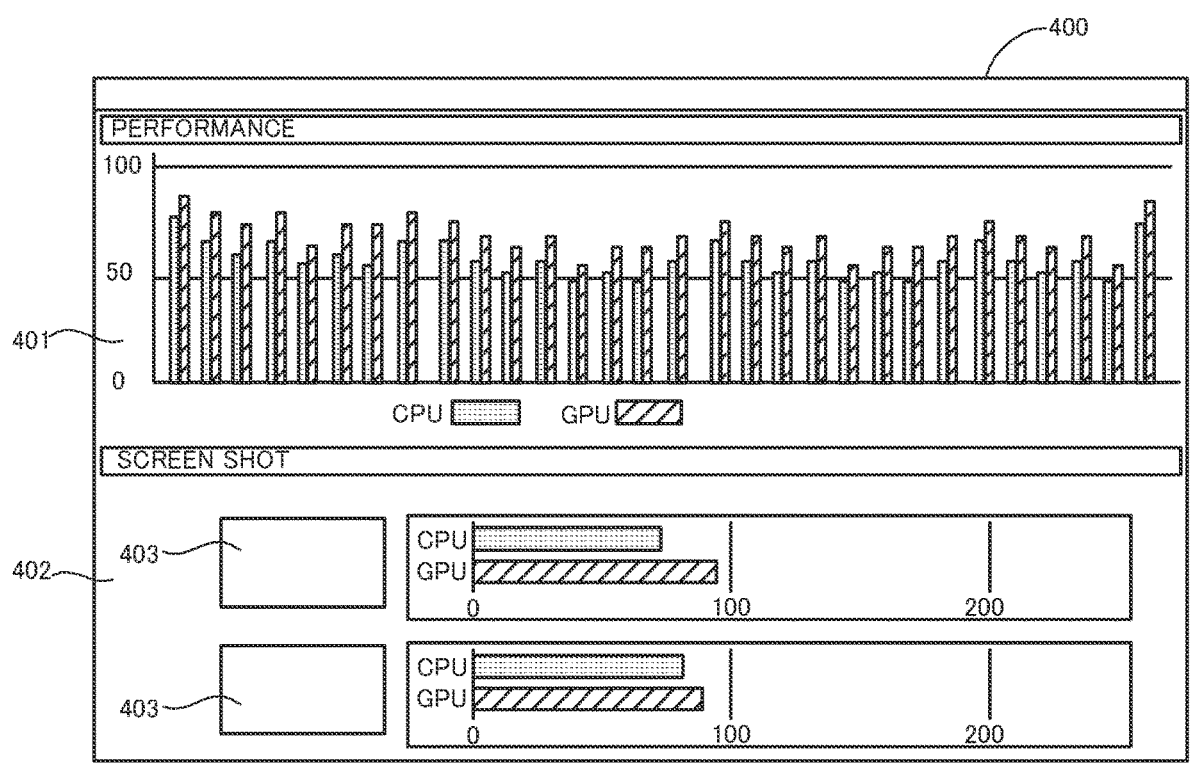
FIG. 11 is a diagram showing an example of an analysis tool for analyzing a load on a processor.

FIG. 11 is an analysis tool for analyzing the load on the game apparatus 1. This analysis tool 400 is generated based on a given table obtained by reading out the processing loads on the CPU and the GPU of the game apparatus 1 from the logs. As shown in FIG. 11, the processing loads on the CPU and the GPU, which are aligned chronologically, are shown in a first region 401 in the upper portion of the analysis tool 400. On the other hand, the average of the processing loads on the CPU and the GPU in the predetermined amount of time and a screen shot 403 of a given game screen displayed in the game processing in that amount of time are shown in a second region 402 in the lower portion of the analysis tool 400. For example, the amount of time of the data shown in the second region 402 can be set by selecting a predetermined amount of time from the first region 401, and the amount of time can also be set manually.

For example, using this analysis tool 400, it is possible to view the timing at which or the game processing by which the processing loads on the CPU and the GPU increase.

Figure 12:
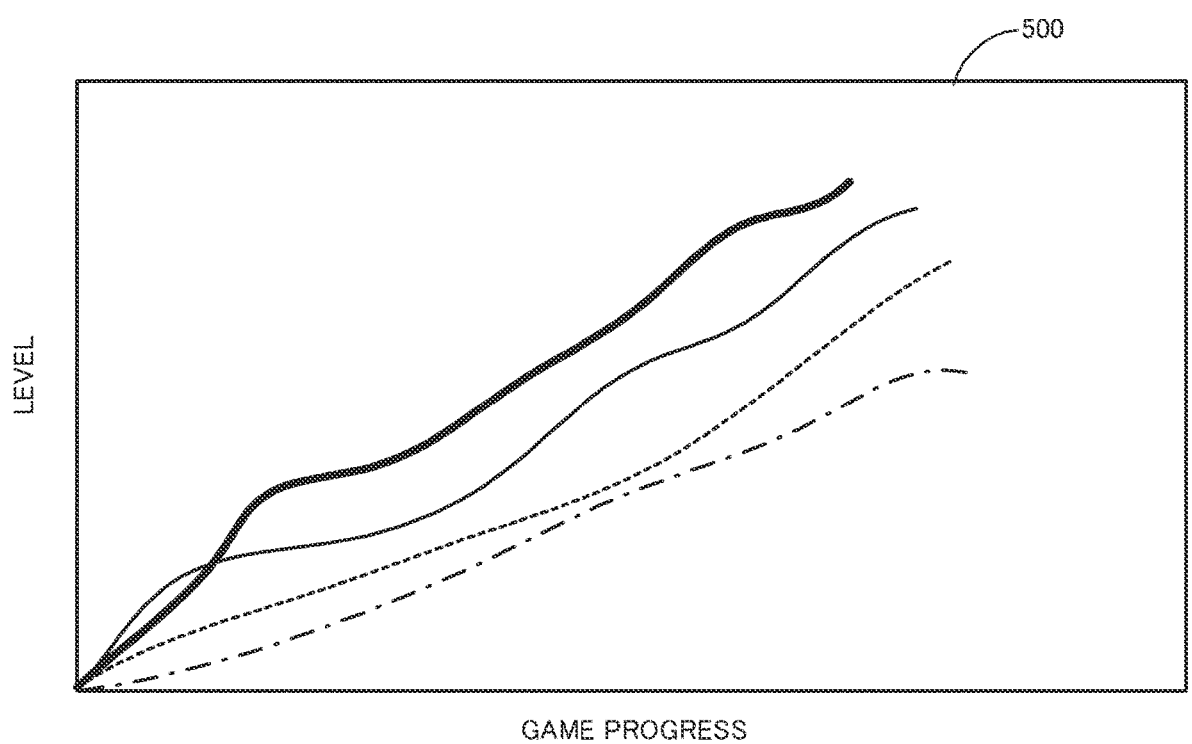
FIG. 12 is a diagram showing an example of an analysis tool for analyzing a change in a level of a player.

Next, the analysis tool shown in FIG. 12 will be described. A graph showing the relationship between the degree of progress of the game and the level of the player is shown on the analysis tool 500 of FIG. 12. This graph is generated based on a given table including the degree of progress (amount of time of performing the game, etc.) of the game and the level of the player included in the log. Although four lines are shown on this graph, these lines indicate changes in the levels when four players perform the game. For example, with this graph, it is possible to view variation in the improvement in level between the players. Also, in addition to the level, any parameter included in the log can be used, and for example, an item that can be acquired in the game (e.g., acquired prize money, etc.) can also be used instead of the level.

Figure 13:
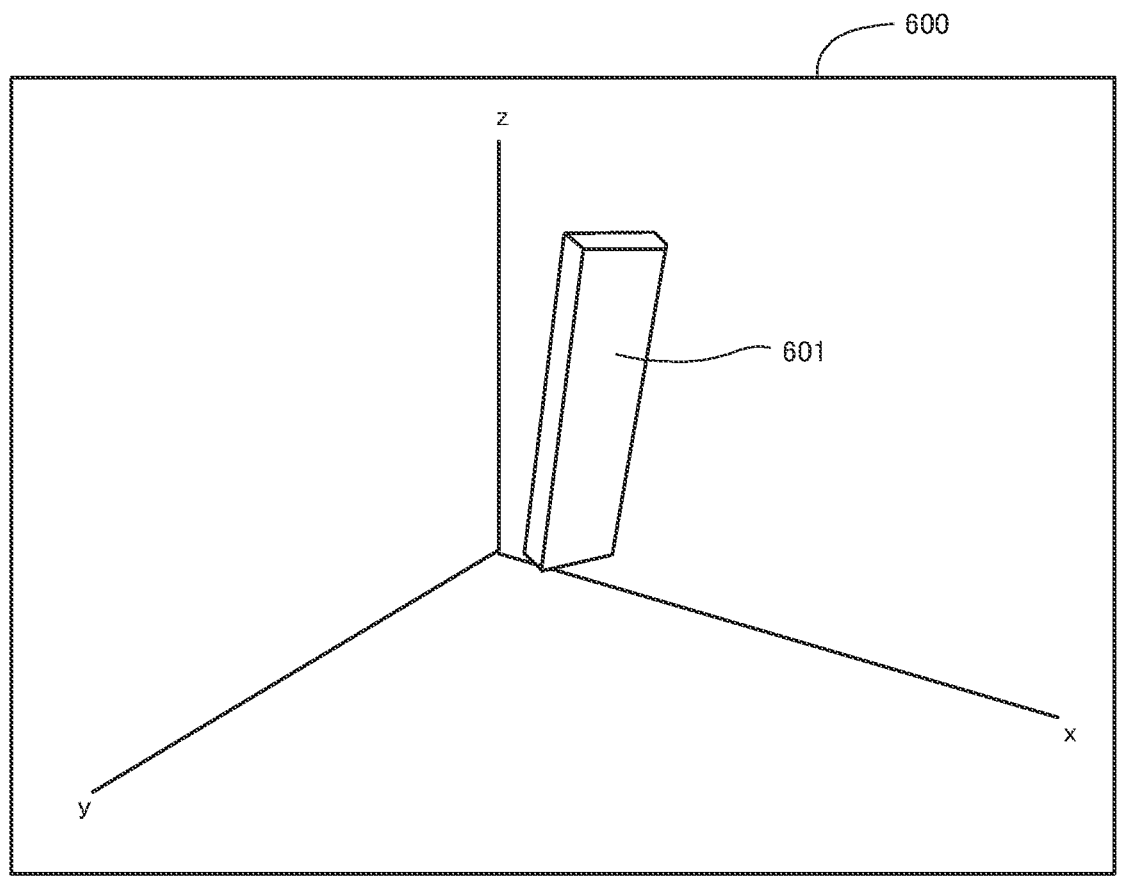
FIG. 13 is a diagram showing an example of an analysis tool for analyzing an orientation of a controller.

FIG. 13 is an analysis tool 600 for visualizing the orientation of the controller 3 or 4 of the game apparatus 1. As described above, since inertia sensors are built into the controllers 3 and 4, the changes in the orientations of the controllers 3 and 4 over time can be generated as logs. Accordingly, for example, if the angles about x, y, and z axes of the controllers 3 and 4 are acquired as logs, it is possible to make the changes over time into a database in the information processing apparatus 200, and based on this database, it is possible to visualize the orientation of an object 601 indicating the controller as shown in FIG. 13. In this case, the orientation at a given time can also be shown, and changes in the orientation within a predetermined amount of time can also be shown by animation.

4. Log Generation Processing

Figure 14:
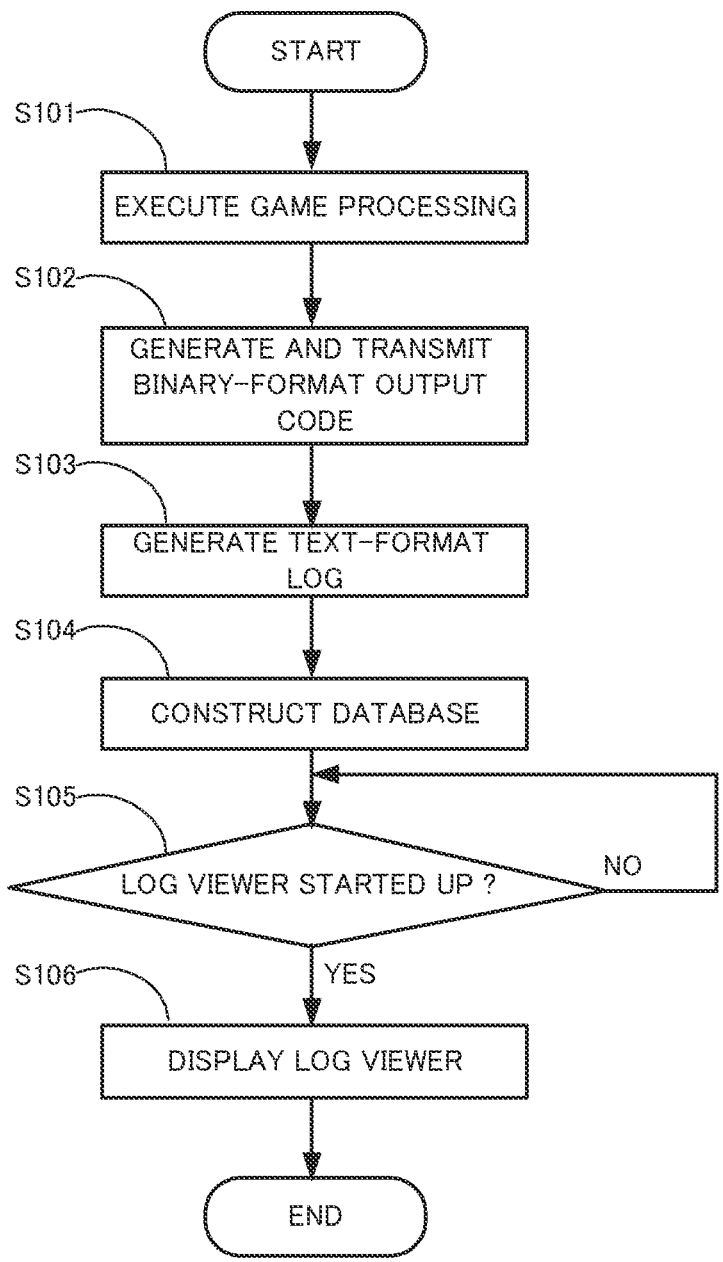
FIG. 14 is a flowchart showing processing such as acquisition of a log.

Next, the processing of the above-described log will be described with reference to the flowchart shown in FIG. 14.

First, the game developer executes the game processing using a game program being developed in the game apparatus 1 (step S101). Then, at a given timing during execution of the game processing, the log generation unit 812 generates a binary-format output code at any time and transmits the generated output code to the information processing apparatus 200 (step S102). Upon receiving the binary-format output code, the information processing apparatus 200 generates the text-format log at any time based on this output code (step S103). Also, the key value extracted from this text-format log is stored in the table of the relevant database 223 by the database generation unit 232 (step S104). Note that as long as the information processing apparatus 200 has received the binary-format output code, one of the generation of the text-format log (step S103) and the construction of the database 223 (step S104) may be performed first, or they may be performed in parallel. Furthermore, when the log viewer 300 is started up (YES in step S105), the log viewer display unit 222 displays the generated text-format logs chronologically on the log display unit 302 of the log viewer 300 (step S106). Thus, the game developer can view the logs generated during game processing using the log viewer 300.

Also, according to need, when the above-described analysis tools 400 and 500 are started up, the analysis tool display unit 242 reads out the logs from the corresponding table, generates graphs or the like included in the analysis tools 400 and 500, and displays the generated graphs or the like on the display unit 204.

5. Characteristics

With the game development system according to the present embodiment, it is possible to obtain the following effects.

(1) The game apparatus 1 is configured such that when the game program being developed is executed and game processing is performed, the processing for substituting the parameters to be used in the game processing into the place holders and generating the character string of the log is not performed by the game apparatus 1 executing the game, but is performed by the information processing apparatus 200 connected thereto, and display is performed thereon. For this reason, it is possible to suppress processing that is performed for log generation by the game apparatus 1. Since this kind of processing for log generation is not performed by the product version of the game program, it is possible to suppress the performance of the game apparatus 1 from being partially used for this kind of processing. That is,
it is possible to suppress the performance of the game apparatus 1 from decreasing due to the generation of the character string of the log while the game processing is being executed by the game apparatus 1. For this reason, the game development system according to the present embodiment is suitable for outputting character strings of a large number of logs and performing the analysis of the game processing.

(2) By storing the key value included in the output code, the parameters to be used in the game processing can be made into a database. For this reason, the database can be used to simplify the analysis of the change over time in the parameters, or for example, parameters such as the above-described load on the processor, the monitoring of the orientation of the controller, and the like. In particular, with a game using a sensor, there are many parameters to be monitored, and therefore a large number of parameters are generated as the character strings of the logs in some cases, but in such a case, the game development system according to the present disclosure is favorable.

6. Variations

An embodiment of the present disclosure has been described thus far. However, the present disclosure is not intended to be limited to the above-described embodiment. Many variations can be made thereon without departing from the gist of the present disclosure. The following variations are possible, for example. The following variations can also be combined as appropriate.

Figure 15:
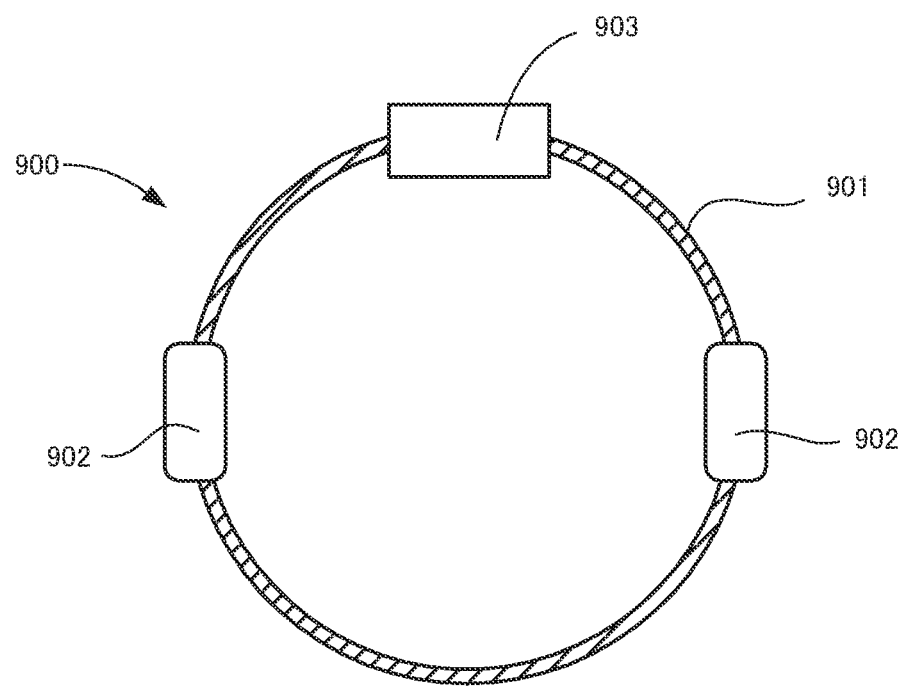
FIG. 15 is a plan view of a ring-shaped controller.
Figure 16:
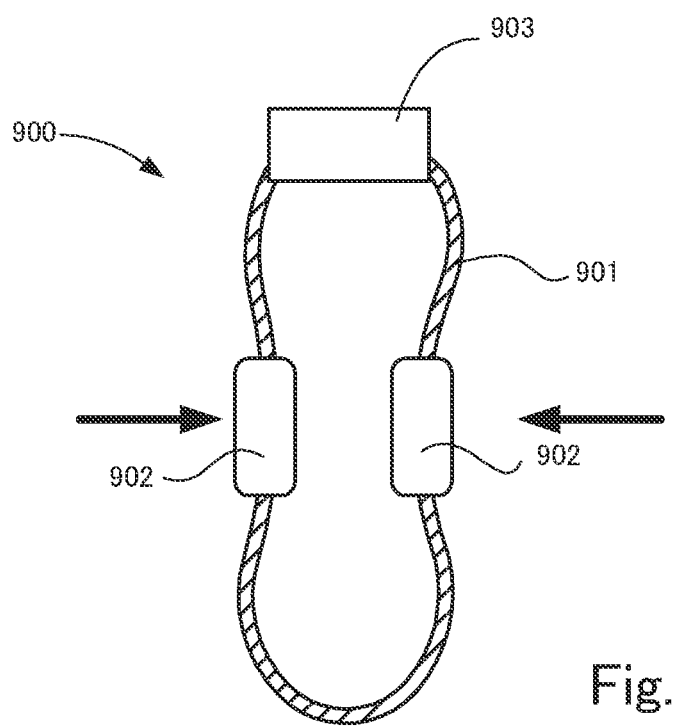
FIG. 16 is a plan view of a deformed ring-shaped controller.

(1) There is no particular limitation on the controller to be used in the game apparatus 1, and it is possible to acquire the behavior of not only the controllers 3 and 4 attached to the above-described game apparatus 1 but also the behavior of a controller used in addition according to the type of the game, as the log. For example, the ring-shaped controller 900 shown in FIG. 15 includes a ring-shaped main body portion 901 that can elastically deform, grip portions 902 that can be attached at positions 180 degrees away from each other on the main body portion 901, and an attachment portion 903 that is provided at a position shifted by 90 degrees from the gripping portions 902. In a game using this ring-shaped controller 900, a player grips the grip portions 902 with both hands according to the progress of the game, and changes the main body portion 901 so as to bring the grip portions 902 close to each other as shown in FIG. 16.

A strain gauge (not shown) is built into the main body portion 901, and by attaching either of the above-described controllers 3 and 4 to the attachment portion 903, it is possible to acquire the force applied to the main body portion 901 and the deformation degree of the main body portion 901 with the controllers 3 and 4 via the strain gauge. Accordingly, for example, if the force applied to the main body portion 901, the deformation degree, and the deformation instance count are output as a log, the degree of degradation of the ring-shaped controller can be monitored. Due to the acquisition of this kind of log, with the analysis tool, for example, it is possible to create a table such as that shown in FIG. 17. Although the controller 900 shown in FIGS. 15 and 16 is an example, it is possible to perform evaluation of a new controller as long as a log corresponding to the structure of the controller is acquired.

(2) In the above-described embodiment, each type of parameter (character string) to be used in the game processing is acquired as a log, but the image data can also be included in the log. Due to the fact that the image data is in a binary format, it is possible to transmit the image data to the information processing apparatus 200 without performing conversion processing, and display of the image as a log can be performed on the information processing apparatus 200. In particular, since the processing of the image has a large load, when this is performed not by the game apparatus 1 but by the information processing apparatus 200, it is possible to reduce the load on the game apparatus 1.

(3) The game apparatus of the above-described embodiment is an example, and there is no particular limitation on the configuration thereof as long as it is possible to perform game processing, generate a binary-format log, and transmit the log to the information processing apparatus.

(4) The output code for generating the log shown in the above-described embodiment is an example, and the output code can be in various formats. That is, at least a character string indicating a place holder and a character string that is not a place holder need only be included in a designated alignment in the output code, and data to be substituted into the place holder (e.g., the above-described key value) need only be included.

(5) The game apparatus of the above-described embodiment is an example, and there is no particular limitation on the configuration thereof as long as it is possible to perform game processing, generate a binary-format log, and transmit the log to the information processing apparatus. For example, it is also possible to use a game apparatus in which the display and the controller are separate members.

(6) The information processing apparatus 200 in the above-described embodiment is an example, and for example, it is also possible to include multiple processors and storage units. For example, the information processing apparatus 200 can also be constituted by multiple computers, or some of the storage units can be provided outside of the information processing apparatus.

LIST OF REFERENCE NUMERALS

1 Game apparatus
200 Information processing apparatus
204 Display unit (display apparatus)
223 Database

What is claimed is:

1. A game development system comprising:
a game apparatus configured to execute a game program being developed; and
an information processing apparatus that is communicably connected to the game apparatus,
wherein processing that the game program being developed causes a computer of the game apparatus to execute includes
generating a log relating to data to be used in game processing during execution of the game processing, and for generating, in a binary format, a log in which a character string indicating a place holder and a character string that is not a place holder are included in a designated alignment and the data to be substituted into the place holder is further included, and
the information processing apparatus is configured to receive, at any time, the log generated at any time accompanying execution of the game processing, and generating and outputting, at any time, a text-format log in which the character string in which the data has been substituted into the place holder and the character string that is not the place holder are written in the designated alignment, based on the received log in the binary format.

2. The game development system according to claim 1, wherein the data is a parameter in a game for which the game processing is being executed.

3. The game development system according to claim 2, wherein
the game is a game in which a game controller including a sensor is to be used, and
the parameter in the game includes a parameter obtained based on output from the sensor.

4. The game development system according to claim 3, wherein
the sensor is an inertia sensor, and
the information processing apparatus is further configured to
display a predetermined user interface and the text-format log,
calculate an orientation of the game controller at any time using a parameter based on output from the inertia sensor included in the log according to an instruction from an operator, and
display, on a display apparatus, a log viewer for displaying an object indicating the orientation of the game controller.

5. The game development system according to claim 2, wherein the information processing apparatus is further configured to display, on a display apparatus, a log viewer for displaying a predetermined user interface and the text-format log, and displaying, in a graph format, the parameter included in the log according to an instruction from an operator.

6. The game development system according to claim 1, wherein the information processing apparatus is further configured to display, on a display apparatus, a log viewer for displaying a predetermined user interface and the text-format log.

7. The game development system according to claim 6, wherein
the character string that is not the place holder includes a character string indicating a category of the data, and
the log viewer displays the text-format log for each said category according to an instruction from an operator.

8. The game development system according to claim 7, wherein
the character string indicating the category indicates a category hierarchically using a combination of a plurality of segmented character strings, and
the log viewer displays the text-format log hierarchically according to an instruction from an operator.

9. The game development system according to claim 1, wherein
the data further includes image data, and
the information processing apparatus is further configured to display, on a display apparatus, a log viewer for displaying a predetermined user interface and the text-format log and further displaying an image regarding the image data included in the log according to an instruction from an operator.

10. The game development system according to claim 1, wherein based on the received log in the binary format, the information processing apparatus is further configured to create a database based on data of the game processing.

11. The game development system according to claim 10, wherein the game apparatus is configured to generate the binary-format log including the character string that is to be the place holder corresponding to the type of the data, and the information processing apparatus is configured to generate the database obtained by categorizing the data to be substituted into the place holder for each type of the character string that is to be the place holder.

12. The game development system according to claim 10, wherein the data to be substituted into the place holder includes data indicating a memory occupancy degree or a load of processing during execution of the game processing by the game apparatus.

13. The game development system according to claim 10, wherein the data to be substituted into the place holder includes data indicating at least one of a play time of a game being executed by the game apparatus, an item that can be acquired in a game, and a degree of completion of a game.

14. The game development system according to claim 10, wherein the data to be substituted into the place holder includes data indicating operation content of a controller to be used for playing the game.

15. A game development method comprising:
generating in a game apparatus a log relating to data to be used in game processing during execution of the game processing using a game program being developed, and generating, in a binary format, a log in which a character string indicating a place holder and a character string that is not a place holder are included in a designated arrangement and the data to be substituted into the place holder is further included; and
receiving in an information processing apparatus, at any time, the log generated at any time accompanying execution of the game processing, and, at any time, generating and outputting a text-format log in which a character string in which the data has been substituted into the place holder and the character string that is not the place holder are written in the designated alignment, based on the received log in a binary format.

16. The game development method according to claim 15, wherein the data is a parameter in a game for which the game processing is being executed.

17. The game development method according to claim 16, wherein
the game is a game in which a game controller including a sensor is to be used, and
the parameter in the game includes a parameter obtained based on output from the sensor.

18. The game development method according to claim 17, wherein
the sensor is an inertia sensor, and
the game development method further includes, in the information processing apparatus, displaying a predetermined user interface and the text-format log,
calculating an orientation of the game controller at any time using a parameter based on output from the inertia sensor included in the log according to an instruction from an operator, and
displaying, on a display apparatus, a log viewer for displaying an object indicating an orientation of the game controller.

19. The game development method according to claim 16, further comprising, in the information processing apparatus, displaying, on a display apparatus, a log viewer for displaying a predetermined user interface and the text-format log and displaying, in a graph format, the parameter included in the log according to an instruction from an operator.

20. The game development method according to claim 15, further comprising, in the information processing apparatus, displaying, on a display apparatus, a log viewer for displaying a predetermined user interface and the text-format log.

21. The game development method according to claim 20, wherein
the character string that is not the place holder includes a character string indicating a category of the data, and
the log viewer displays the text-format log for each said category according to an instruction from an operator.

22. The game development method according to claim 21, wherein
the character string indicating the category indicates a category hierarchically using a combination of a plurality of segmented character strings, and
the log viewer displays the text-format log hierarchically according to an instruction from an operator.

23. The game development method according to claim 15, wherein
the data further includes image data, and
the game development method further includes, in the information processing apparatus, displaying, on a display apparatus, a log viewer for displaying a predetermined user interface and the text-format log and further displaying an image relating to image data included in the log according to an instruction from an operator.

24. The game development method according to claim 15, further comprising a step of the information processing apparatus further creating a database based on data of the game processing, based on the received log in the binary format.

25. The game development method according to claim 24, wherein
the game apparatus is configured to generates the binary-format log including the character string that is to be the place holder corresponding to the type of the data, and
the information processing apparatus is configured to generate the database obtained by categorizing data to be substituted into the place holder for each type of the character string that is to be the place holder.

26. The game development method according to claim 24, wherein the data to be substituted into the place holder includes data indicating a memory occupancy degree or a load of processing during execution of the game processing by the game apparatus.

27. The game development method according to claim 24, wherein the data to be substituted into the place holder includes data indicating at least one of a play time of a game being executed by the game apparatus, an item that can be acquired in a game, and a degree of completion of a game.

28. The game development method according to claim 24, wherein the data to be substituted into the place holder includes data indicating operation content for a game controller to be used for playing the game.

* * * * *